United States Patent [19]
Arimoto et al.

[11] Patent Number: 4,567,538
[45] Date of Patent: Jan. 28, 1986

[54] ALTERNATING CURRENT LIMITING APPARATUS

[75] Inventors: Satomi Arimoto, Nishinomiya; Hiroyuki Hirakawa, Minoo; Hiroshi Maekawa, Suita, all of Japan

[73] Assignee: Mitsubishi Denki Kabushiki Kaisha, Tokyo, Japan

[21] Appl. No.: 571,528

[22] Filed: Jan. 17, 1984

[30] Foreign Application Priority Data

Feb. 2, 1983 [JP] Japan .................... 58-16584

[51] Int. Cl.⁴ .............................. H02H 9/02
[52] U.S. Cl. ..................................... 361/58
[58] Field of Search .............. 361/10, 11, 58, 113

[56] References Cited

U.S. PATENT DOCUMENTS 3,418,532 12/1968 Becker ..................... 361/113
4,158,864 6/1979 Kennon ..................... 361/58

FOREIGN PATENT DOCUMENTS 50-78850 6/1975 Japan .
680104 8/1979 U.S.S.R. ..................... 361/58

Primary Examiner—Harry E. Moose, Jr.
Attorney, Agent, or Firm—Wenderoth, Lind & Ponack

[57] ABSTRACT

An alternating current limiting apparatus is disclosed which normally forms first and second series circuits connected in parallel with each other between different kinds of power system lines. The first series circuit is resonated with a reactor and a capacitor at a line frequency to directly interconnect the power system lines. The second series circuit is composed of a capacitor or a reactor and two resistors. Between the interconnection of the reactor and the capacitor of the first series circuit and the interconnection of both resistors, a closing device is connected. Upon the occurrence of a fault of either of the power systems, the closing device is thereby actuated to form a parallel resonance circuit with the combination of the reactor or capacitor of the first series circuit and the capacitor or reactor of the second series circuit to limit current flowing between the power system lines. The resistor included in the parallel resonance circuit serves to damp a circulating current while the other resistor serves to lighten the interruption duty of a circuit breaker inserted in the power system lines.

6 Claims, 4 Drawing Figures

ALTERNATING CURRENT LIMITING APPARATUS

BACKGROUND OF THE INVENTION

This invention relates to an alternating current limiting apparatus, and in particular to an apparatus for limiting a transient fault overcurrent which occurs upon the occurrence of a fault such as a ground fault or a line shortcircuit within AC power distribution lines or AC power transmission lines within a power system or between different power systems.

Such an alternating current limiting apparatus is previously known in the art as illustrated in Japanese Pat. No. 987,109 which corresponds to Japanese Patent Application Laid-open No. 50-78850 published on June 26, 1975, and also corresponds with the U.S. patent application Ser. No. 411,888 by John Rosa et al.

This Japanese Pat. No. 987,109 particularly discloses, as shown in FIG. 9 thereof, a bridged alternating current limiting apparatus which is inserted in each phase between two different power systems and is composed of two sets of reactors and capacitors, each set being a series combination of a reactor and a capacitor. The respective interconnections in each series combination are connected through the series combination of a closing device, which is composed of a reverse parallel combination of SCR's, and a resistor.

This conventional alternating current limiting apparatus normally operates as two sets of series resonance circuits, for the line frequency of the different power systems, connected in parallel with each other without the operations of the closing device and the resistor. As a result, the alternating current limiting apparatus serves to directly interconnect the different power systems thereacross. In the case of a fault, the closing device detects an abrupt increase of voltage across the interconnections of the respective series combinations to bridge these interconnections. As a result, two parallel resonance circuits are formed to limit an overcurrent through the different power systems by a large impedance according to the parallel resonances.

Such a conventional series-parallel resonance type apparatus as disclosed in Japanese Pat. No. 987,109 is advantageous in that the transient stability of the systems is improved and the interruption duty for a circuit breaker is lightened because of the low restriking voltage upon the circuit interruption.

However, it is disadvantageous in the following respects:

(1) Since two sets of series resonance circuits of reactors and capacitors are connected in parallel with each other, the circuit arrangement is rather complicated and expensive.

(2) Although there is no problem if the inductance values of both reactors are identical and the capacitance values of both capacitors are also identical, the presence of component variations, if the variations are considerable, will cause a high circulating current to flow through the alternating current limiting apparatus.

(3) If the closing device comprises a non-linear resistive element, both capacitors remain charged so that a discharging resistor or reactor, etc., will have to be provided.

(4) If the closing device comprises a gap or a closing switch, the current limiting effect becomes better as the resistance value of the resistor connected in series with the closing device becomes smaller. Accordingly, it will take a considerable time until the electrical energy stored in the reactors and the capacitors is dissipated after the power systems have been interrupted by a circuit breaker, and so that the limited current has been interrupted.

(5) The resonance of a line inductance in a power transmission line connecting the different power systems and a capacitance between the line and ground provides a high frequency oscillation current which provides an abrupt surge current at a high frequency flowing through a path consisting of one of the capacitors, the resistor, and the other of the capacitors, thereby barely actuating the circuit breaker.

SUMMARY OF THE INVENTION

It is accordingly an object of the invention to provide an alternating current limiting apparatus which eliminates the prior art disadvantages as indicated above.

The present invention provides an alternating current limiting apparatus comprising first and second series circuits, and a closing device. The first series circuit is connected between different kinds of power system lines and is formed of a first and a second component. The second series circuit is connected in parallel with the first series circuit and is formed of a third component and two series resistors. The closing device is inserted between the interconnection of the first and second components of the first series circuit and the interconnection of both resistors of the second series circuit.

This alternating current limiting apparatus normally forms a series resonance circuit with the first and second components of the first series circuit with the closing device maintained in its open state. When a fault occurs in either of the power systems, the alternating current limiting apparatus forms a parallel resonance circuit with the first and third components by the closing device being actuated.

The first component may be a capacitive component while at the same time the second and third components may be inductive components. Alternatively, the first component may be an inductive component while at the same time the second and third components may be capacitive components. The closing device may be a non-linear resistive element.

BRIEF DESCRIPTION OF THE DRAWINGS

For a better understanding of the invention, reference may be had to the preferred embodiments exemplary of the invention shown in the accompanying drawings in which.

Throughout the figures, the same reference numerals indicate identical or corresponding portions.

DETAILED DESCRIPTION OF THE PREFERRED EMBODIMENT

Figure 1:
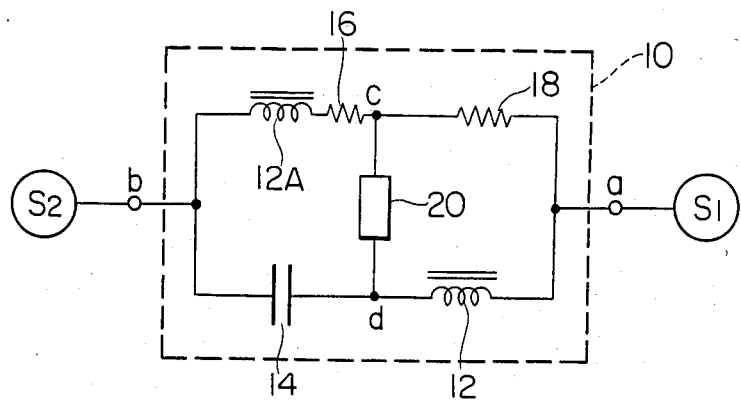
FIG. 1 shows the circuit diagram of one embodiment of an alternating current limiting apparatus in accordance with the present invention.

Referring now to the drawings and FIG. 1 in particular, a first embodiment of an alternating current limiting apparatus in accordance with the present invention is shown as a broken line block, generally designated by a reference numeral 10, inserted between interconnecting junctions a-b of two different kinds of power systems S1 and S2. It is to be noted that FIG. 1 illustrates only one phase connection for convenience's sake.

The alternating current limiting apparatus 10 includes a first series circuit formed of a reactor 12 and a capacitor 14, and a second series circuit formed of a reactor 12A and two resistors 16 and 18. The first and second series circuits are connected in parallel with each other between the power systems S1 and S2. Across the interconnection c of the resistors 16 and 18 and the interconnection d of the reactor 12 and the capacitor 14, a closing device 20, which may be a gap, contacts, a non-linear resistive element, or a semiconductor device such as shown by a reverse parallel connection of SCR's in Japanese Pat. No. 987,109 as set forth above, is connected.

In the operation of the current limiting apparatus according to the present invention thus constructed, since the electrical potentials of these two kinds of the systems S1 and S2 are normally substantially the same, the potential difference across the interconnections c and d is so low that the closing device 20 may not be actuated or closed. Therefore, the closing device 20 is now disposed in its open state, thereby forming a series resonance circuit consisting of the reactor 12 and the capacitor 14. This series resonance circuit performs a tuned operation for the line frequency within the power systems S1 and S2. On this occasion, the total impedance of the alternating current limiting apparatus 10 is substantially equal to zero so as to directly interconnect the power systems S1 and S2.

When a transient overcurrent flows through the power systems S1 and S2 upon the occurrence of a fault, the potential difference across the interconnections c-d abruptly increases. By the detection of this abrupt increase, the closing device 20 is actuated, thereby causing it to close by the automatic discharge thereacross if it comprises a gap, by an external control means if it comprises a mechanical switch or a semiconductor switch as disclosed in the above noted Japanese Pat. No. 987,109, or by the impedance being automatically reduced to zero if it comprises a non-linear resistive element. The actuation of the closing device 20 directly bridges or shortcircuits the interconnections c-d to form two parallel circuits serially connected with each other between the power systems S1 and S2. One of the parallel circuit is formed of the capacitor 14 with the reactor 12A and the resistor 16, and so is substantially resonated or tuned by the capacitor 14 with the reactor 12A. The other of the parallel circuit is formed of the reactor 12 and the resistor 18.

The parallel resonance circuit of the capacitor 14 and the reactor 12A interconnects the power systems S1 and S2 through a high impedance, thereby suppressing the overcurrent flowing through the power systems S1 and S2. In this case, if the resistance of the resistor 16 is substantially zero, then the total impedance of the alternating current limiting apparatus 10 will be infinite, thereby most effectively suppressing the overcurrent.

The advantageous functions of the resistors 16 and 18 will now be described.

As described above, if the resistance of the resistor 16 is substantially zero, the total impedance of the alternating current limiting apparatus 10 will be infinite, thereby most effectively suppressing the overcurrent through the power systems S1 and S2. However, after a fault current through the power systems S1 and S2 has been restricted by the apparatus 10 and current between the power systems S1 and S2 has been interrupted by a circuit breaker (not shown), the inductive energy stored in the reactor 12A and the capacitive energy stored in the capacitor 14 provide a circulating current through the closed circuit round the interconnections b-c-d and if the resistance of the resistor 16 is small, it will take too much time to thermally dissipate the stored energy, thereby requiring a considerable time for the attenuation of the circulating current. Therefore, a suitable resistance is needed for the closed circuit. This is the reason why the resistor 16 is provided.

The function of the resistor 18 is firstly to thermally dissipate the inductive energy stored in the reactor 12, thereby preventing an energy from being dissipated externally. The second function is to prevent a high frequency oscillating current generated by the resonance of a line inductance in a power transmission line connecting the power systems S1 and S2 with a capacitance between the line and ground from flowing, as an abrupt surge current at a high frequency, into a circuit breaker on the side of the power system S1 or S2 through the path of the interconnection a—the resistor 18—the interconnection c—the closing device 20—the interconnection d—the capacitor 14—the interconnection b, thereby lightening the interruption duty of the circuit breaker. Therefore, the resistor 18 is required to have a suitable resistance.

It should be noted that there is no problem of the high frequency oscillating current flowing into the circuit breaker through the path of the interconnection a—the reactor 12—the interconnection d—the closing device 20—the interconnection c—the resistor 16—the reactor 12A—the interconnection b since both reactors provide a high impedance for the high frequency.

Figure 2:
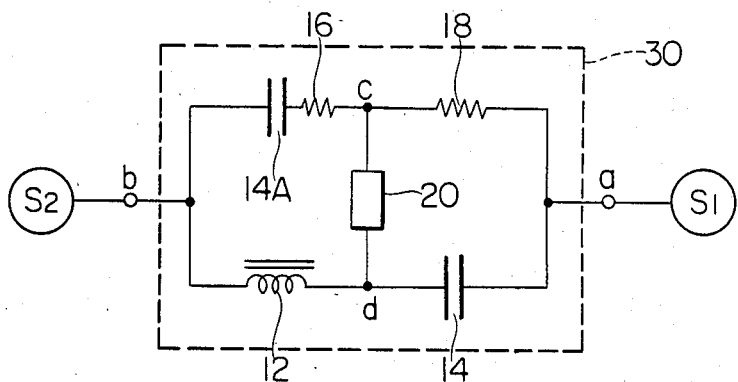
FIG. 2 shows the circuit diagram of another embodiment of an alternating current limiting apparatus in accordance with the present invention.

Referring to FIG. 2, a second embodiment of an alternating current limiting apparatus in accordance with the present invention is shown as a broken line block, generally designated by a reference numeral 30, inserted between the interconnecting junctions a-b of the power systems S1 and S2. Comparing the circuit diagram of FIG. 2 with that of FIG. 1, it will be seen that the reactors 12 and 12A as well as the capacitor 14 in FIG. 1 are respectively exchanged for the capacitors 14 and 14A as well as the reactor 12 in FIG. 2.

Also in FIG. 2, it will be appreciated by those skilled in the art without a repeated description thereof that substantially the same circuit operations as in FIG. 1 are performed.

Figure 3:
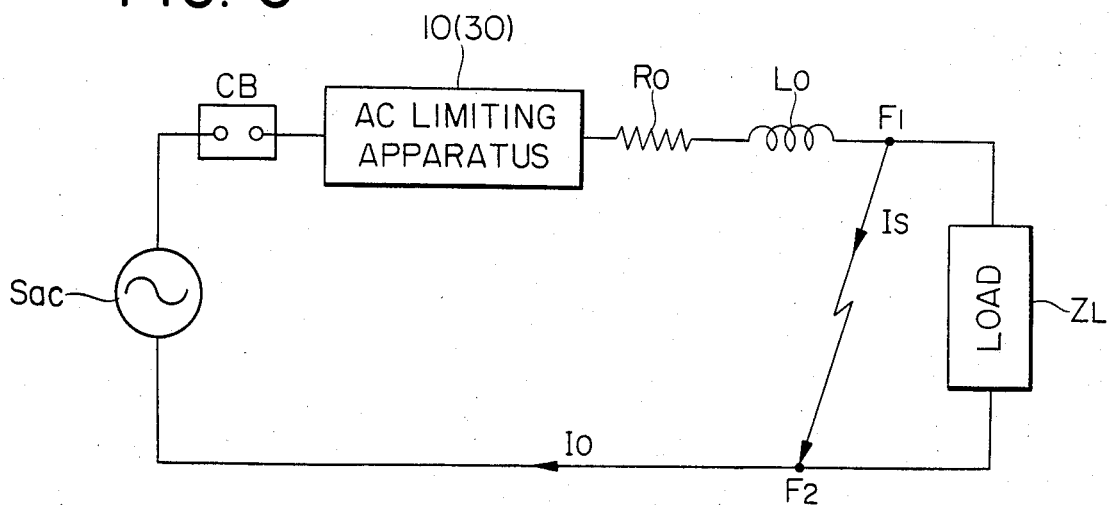
FIG. 3 shows an equivalence circuit diagram incorporating the alternating current limiting apparatus of FIGS. 1 and 2 the present invention; and, FIG. 4 shows characteristic waveforms as a result of computer simulation of the equivalence circuit in FIG. 3.

FIG. 3 illustrates an example of an equivalent circuit incorporating the alternating current limiting apparatus 10 or 30 of the present invention, in which a circuit breaker CB, the alternating current limiting apparatus 10 or 30, a line resistance Ro, a line inductance Lo, and a load ZL are serially connected to each other across an AC power source Sac.

Figure 4:
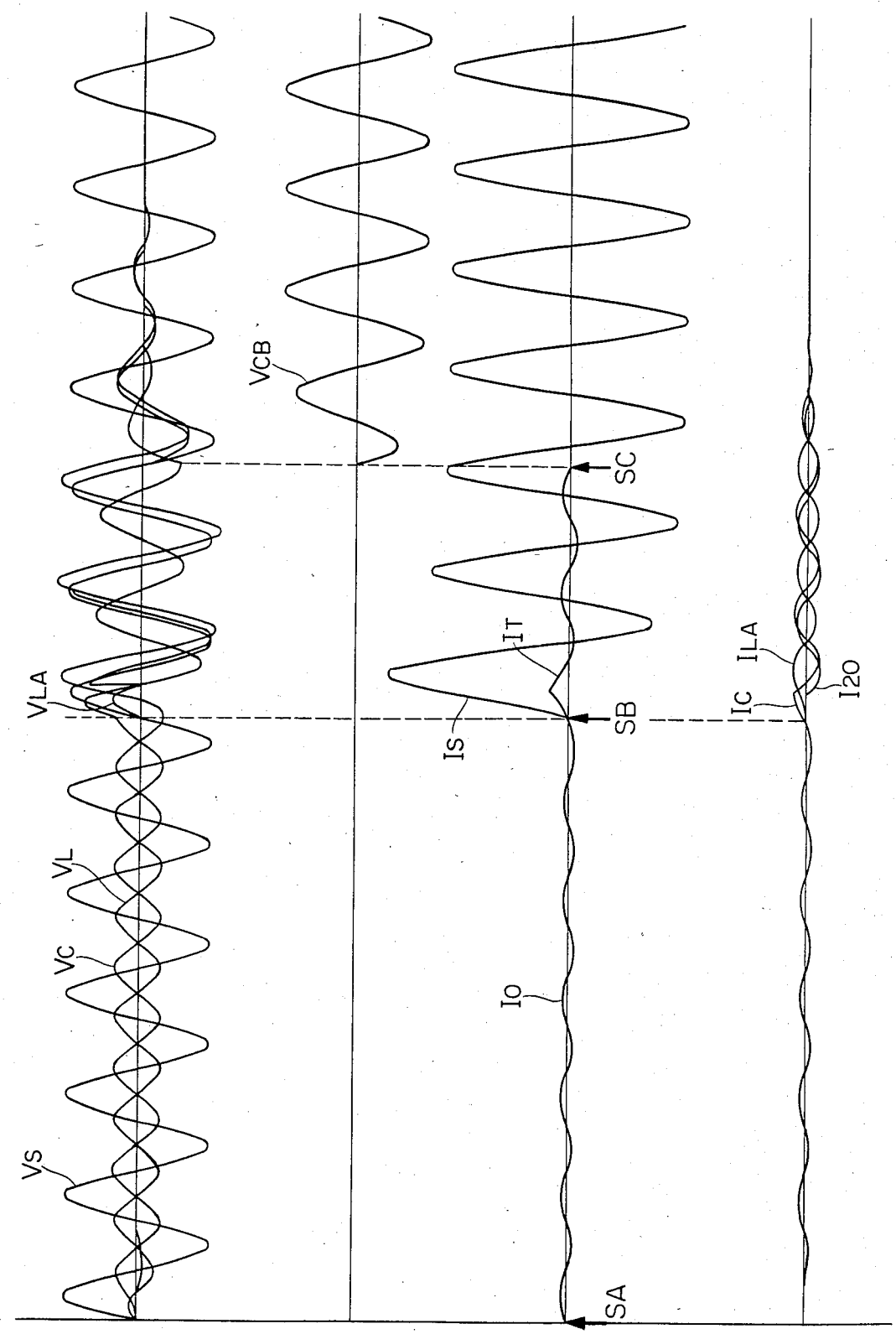

FIG. 4 shows simulated waveforms as a function of time obtained at various points in the circuit of FIG. 3 by means of a computer, in the case where the alternating current limiting apparatus 10 of FIG. 1 is used as an example and the closing device 20 comprises a gap.

$V_c$, $V_c$, $V_L$, and $V_{LA}$ shown in the top graph in FIG. 4 respectively represent the simulated voltage waveforms, of the power source Sac, across the terminals of the capacitor 14, across the terminals of the reactor 12, and across the terminals of the reactor 12A. $V_{CB}$ shown in the second graph from the top represents the simulated waveform of the voltage across the electrodes of circuit breaker CB. $I_O$, $I_S$, and $I_T$ shown in the second graph from the bottom respectively represent the simulated current waveforms, during normal condition in the circuit of FIG. 3, during a shortcircuit across shortcircuit fault points F1 and F2 (as indicated in FIG. 3) in the normal case where the closing device is not actuated, and limited current in FIG. 3 in the fault case during the time that the closing device is actuated. It is to be noted that SA, SB, and SC shown in the same graph respectively represent, the initiation point of electrical conduction, the shortcircuit occurrence point, and the interruption completion point. $I_C$, $I_{LA}$, and $I_{20}$ shown in the bottom graph respectively represent the simulated current waveforms, of the capacitor 14, the reactor 12A, and the closing device 20.

Observing FIG. 4, the following advantages or effects will be provided in accordance with the present invention:

(1) A favorable result is obtained with respect to the transient stability of the power systems because the limited current is resistive;

(2) A restriking voltage for a circuit breaker is so low that the interruption duty of the circuit breaker is lightened because the alternating current limiting apparatus forms a closed circuit upon a fault and therefore the energy stored in the reactor and capacitor is thermally dissipated by the resistor 16 in the closed circuit and the high frequency oscillating current due to the line inductance Lo and the capacitance between the line and ground is damped by the other resistor 18;

(3) The circulating current of the alternating current limiting apparatus is damped in a short time interval in the presence of the resistors 16 and 18, requiring no discharging reactor or resistor for the capacitor.

While particular embodiments of the invention have been shown and described for a purpose of illustration, other arrangements and embodiments may be practiced by those skilled in the art without departing from the scope and spirit of the invention.

What we claim is :

1. An alternating current limiting apparatus comprising:

a first series circuit connected between different kinds of power system lines and formed of first and second components;

a second series circuit connected in parallel with said first series circuit and formed of a third component and two resistors serially connected to each other; and, a closing device inserted across the interconnection of said first and second components and the interconnection of both of said resistors;

said closing device being normally maintained in its open state to form a series resonance circuit with said first and second components, while, upon the occurrence of a fault of either of said power systems, said closing device is closed to form a parallel resonance circuit with said first and third components.

2. An alternating current limiting apparatus according to claim 1 wherein said first component comprises a capacitive one and said second and third components comprise inductive ones.

3. An alternating current limiting apparatus according to claim 1 wherein said first component comprises a inductive one and said second and third components comprise capacitive ones.

4. An alternating current limiting apparatus according to claim 1 wherein said closing device comprises a non-linear element.

5. An alternating current limiting apparatus according to claim 2, wherein said closing device comprises a non-linear element.

6. An alternating current limiting apparatus according to claim 3, wherein said closing device comprises a non-linear element.

* * * * *